(12) United States Patent
Swisher

(10) Patent No.: US 6,385,253 B1
(45) Date of Patent: May 7, 2002

(54) METHOD AND APPARATUS FOR RELIABLE RECEPTION OF VDSL SIGNALS

(75) Inventor: James L. Swisher, Santa Rosa, CA (US)

(73) Assignee: Next Level Communications, Rohnert Park, CA (US)

( * ) Notice: Subject to any disclaimer, the term of this patent is extended or adjusted under 35 U.S.C. 154(b) by 0 days.

(21) Appl. No.: 09/459,755

(22) Filed: Dec. 10, 1999

(51) Int. Cl.[7] .............................................. H04L 27/00
(52) U.S. Cl. ...................... 375/259; 375/222; 375/229; 375/230; 379/390; 379/402
(58) Field of Search ................. 375/259, 222, 375/229, 230; 379/390, 402, 408, 420

(56) References Cited

U.S. PATENT DOCUMENTS

| | | | | |
|---|---|---|---|---|
| 3,914,557 A | * | 10/1975 | O'Neill | 179/84 VF |
| 4,132,863 A | * | 1/1979 | Smith | 179/16 F |
| 4,228,323 A | * | 10/1980 | Feiner et al. | 179/16 F |
| 4,453,037 A | * | 6/1984 | Terry | 179/16 F |
| 5,929,896 A | | 7/1999 | Goodman et al. | 348/14 |
| 5,953,373 A | * | 9/1999 | Park | 375/229 |
| 6,069,899 A | * | 5/2000 | Foley | 370/494 |

* cited by examiner

*Primary Examiner*—Mohammad H. Ghayour
(74) *Attorney, Agent, or Firm*—Morrison & Foerster LLP

(57) ABSTRACT

The present invention encompasses the reception of a Very High Speed Digital Subscriber Line (VDSL) signal from a twisted wire pair drop cable and an amplification circuit for compensating losses encountered while the signal is traversing the transmission medium. The amplification circuit receives a control signal from a microcontroller for providing selective gain to the signal based on the loop length or the power of the received signal. The amplification circuit incudes at least one resonator circuit which can be selectively switched in and out of the amplification circuit.

19 Claims, 9 Drawing Sheets

| BINARY CONTROL SIGNAL | SWITCH 430 | SWITCH 440 | LOOP LENGTH |
|---|---|---|---|
| 00 | OFF | OFF | l < 2kft |
| 10 | ON | OFF | 2kft ≤ l < 3kft |
| 01 | OFF | ON | 3kft ≤ l < 4kft |
| 11 | ON | ON | l ≥ 4kft |

METHOD AND APPARATUS FOR RELIABLE RECEPTION OF VDSL SIGNALS

BACKGROUND OF THE INVENTION

The advent of the Internet and the demand for bandwidth has created the need for telecommunications systems which are able to provide high speed digital connections to and from a subscriber's residences. Because of the large amount of twisted wire pair cables which have been deployed for telephone service over many decades, there is a tremendous incentive to reuse these cables to provide high speed data services in addition to telephone services.

A number of techniques have been developed for transmitting high speed digital data signals over twisted wire pairs and include Integrated Digital Services Network (ISDN) technologies, Asymmetric Digital Subscriber Line (ADSL) technologies, Rate Adaptive Digital Subscriber Line (RADSL) technologies and Very High Speed Digital Subscriber Line (VDSL) technologies.

Of these technologies, VDSL provides the highest data rates to and from the subscriber, and can potentially provide data rates of 52 Mb/s over loop lengths of 3,000 ft. However, in transmitting such high speed signals over twisted wire pair, the loss is quite substantial and is not equal over the frequency range in which the signals are transmitted.

In addition, the loss depends heavily on the loop length, and it is not possible to use a constant slope amplifier to equalize the VDSL signal. Furthermore, the circuit that performs the equalization is typically located at the subscriber side of the network, and cannot easily be accessed by the network operator.

For the foregoing reasons, there is a need for a method and apparatus which provides for equalization and reliable reception of a VDSL signal.

SUMMARY OF THE INVENTION

In the present invention a Very High Speed Digital Subscriber Line (VDSL) signal is received from a twisted wire pair drop cable, and an equalization circuit provides additional gain in the high end of the VDSL band in order to compensate for the higher losses on the twisted wire pair at those frequencies.

In a preferred embodiment, the additional amplification is realized through the use of a resonator circuit. The resonator circuit can be switched in and out of the gain block using a field effect transistor.

In a preferred embodiment, a determination can be made as to whether the equalization is necessary, and the circuit selectively switched in or out depending on the results of the determination.

In a preferred embodiment the total power received is measured and a determination is made that the higher frequencies have been severely attenuated.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 5 illustrates the various operating modes of the AFE slope amplificater circuit;

DETAILED DESCRIPTION OF THE PREFERRED EMBODIMENTS

Figure 1:
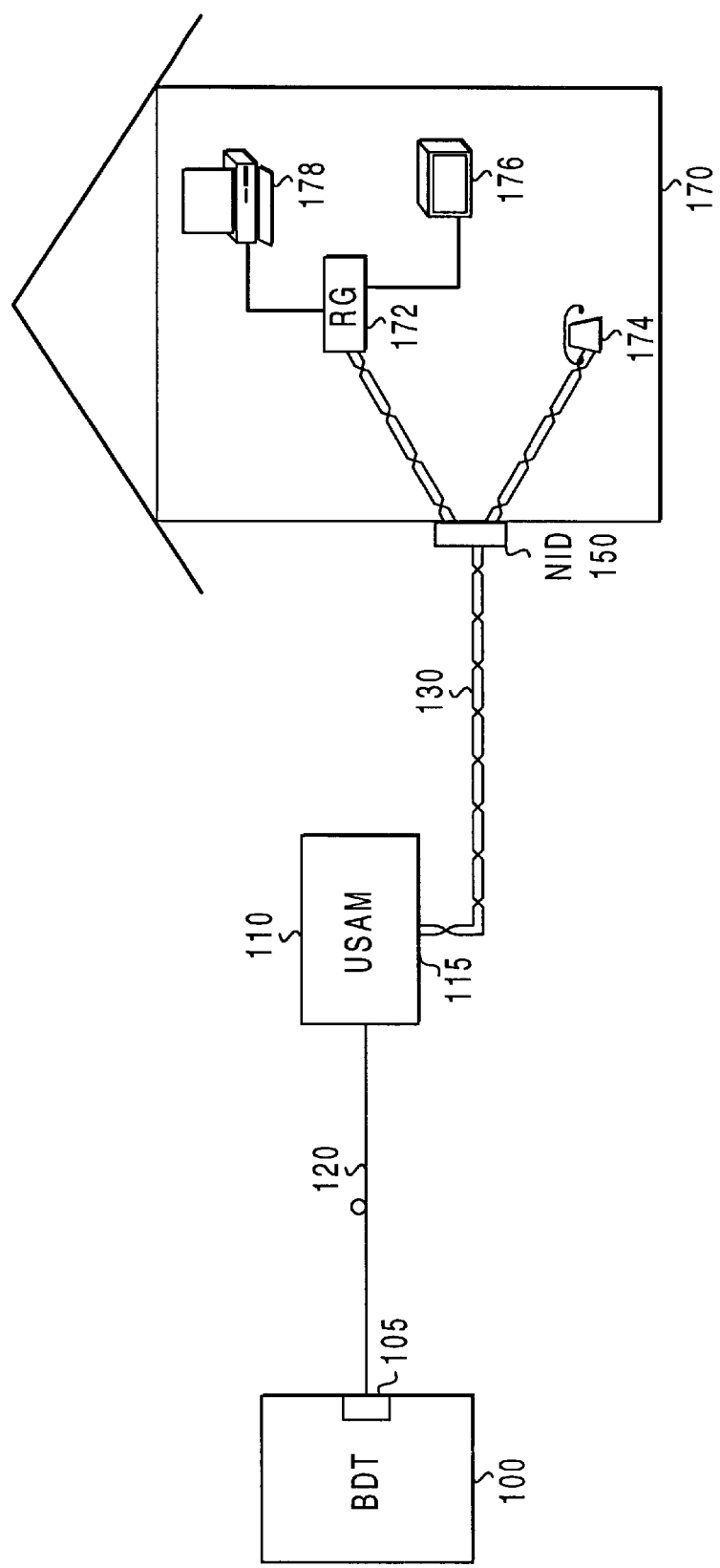
FIG. 1 illustrates a Very High Speed Digital Subscriber Line (VDSL) transmission system.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 8 in particular, the apparatus of the present invention is disclosed.

FIG. 1 shows a Very High-Speed Digital Subscriber line (VDSL) transmission system. The VDSL transmission system can be part of a broadband transmission. FIG. 1 illustrates the VDSL transmission system as part of a full service access system. A Broadband Digital Terminal (BDT) 100, which is typically located in a central office, may also be placed in a remote location. The BDT 100 interfaces voice services from a Public Switched Telecommunications Network (PSTN) as well as video and data services from an Asynchronous Transfer Mode (ATM) network through its network interface unit (NIU), which is not illustrated. Voice, video and data services are transported to a Universal Service Access Multiplexor (USAM) 110 using an optical fiber link 120. An Optical Distribution Unit (ODU) 105 provides the connectivity between the BDT 10 and the USAM 110.

The USAM 100 can be located in the field as part of the central office configuration or in the customer premises, typically in an apartment building. The USAM 100 includes a VDSL Transceiver Unit (VTU) modem 115, which is referred to as a VTU-C modem. The VTU-C modem 115 supports both analog phone services and high speed data by multiplexing both signals into the same transmission medium, which is a twisted wire pair 130.

At the residence, the Network Interface Device (NID) 150, which contains a filter, separates the voice signal from the data signal. The voice signal is distributed within the home on the in-home telephone wiring to the telephone set 174, while the data signal can be sent to a residential gateway (RG) 172, which can support video 176, computer 178 or voice services.

Figure 2:
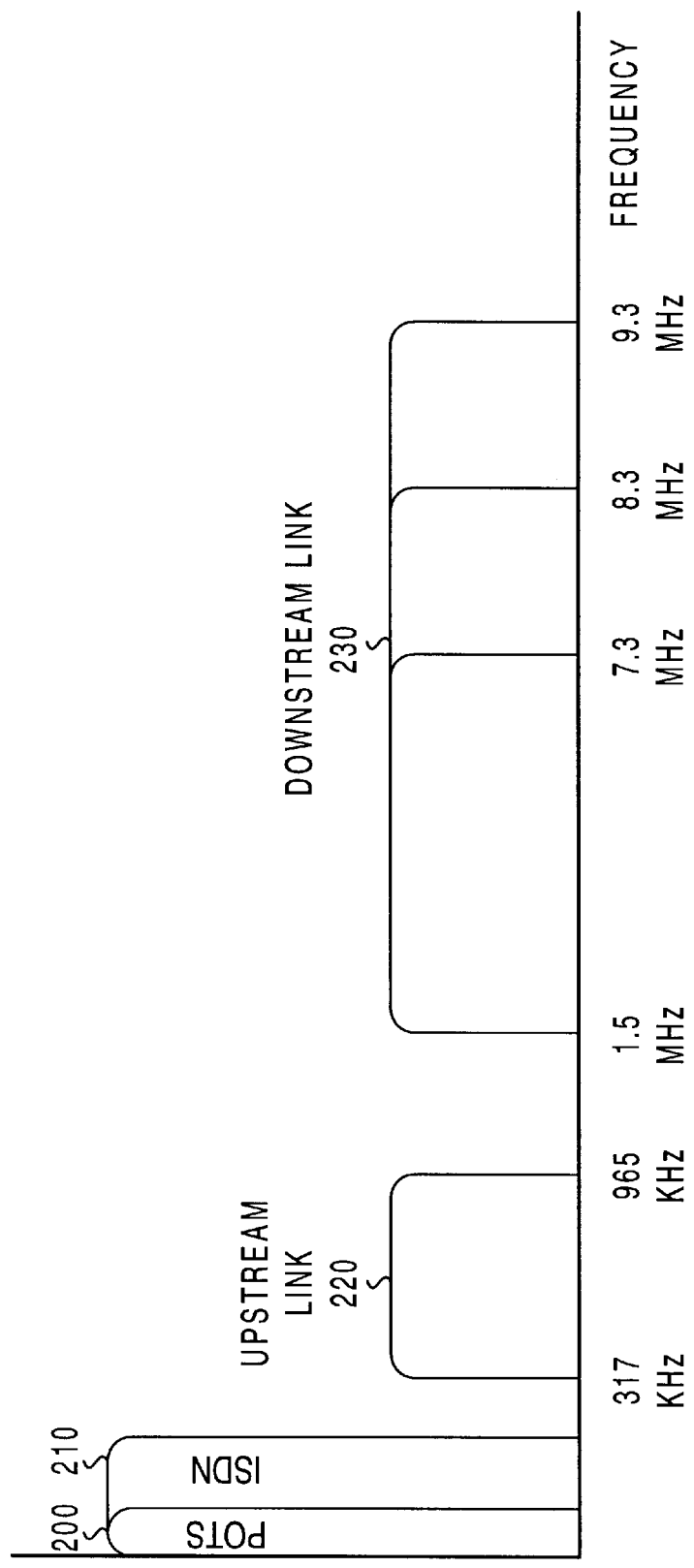
FIG. 2 illustrates a VDSL spectral allocation.

FIG. 2 shows one embodiment of a VDSL spectral allocation. The twisted wire pair spectrum is divided into sub-bands with each sub-band carrying a particular service. The lower band 200 is reserved for the Plain Old Telephone Service (POTS) and occupies the spectrum from 0 to 3 kHz. Next to the POTS spectrum is an Integrated Services Digital Network (ISDN) band 210 which can provide data services at a basic rate of 144 kbps.

The upstream link 220 ranges from approximately 317 kHz to 965 kHz centered at 641.25 kHz. In a preferred embodiment, the symbol rate in the upstream link 220 is fixed at 540 kbaud with three possible bit rates of 1.08 Mbps, 2.16 Mbps and 3.24 Mbps using QPSK, 16-QAM and 64-QAM modulation, respectively. The downstream link 230 ranges from approximately 1.5 MHz to 9.3 MHz allowing bit rates from 9.72 Mbps to 25.92 Mbps.

Figure 3:
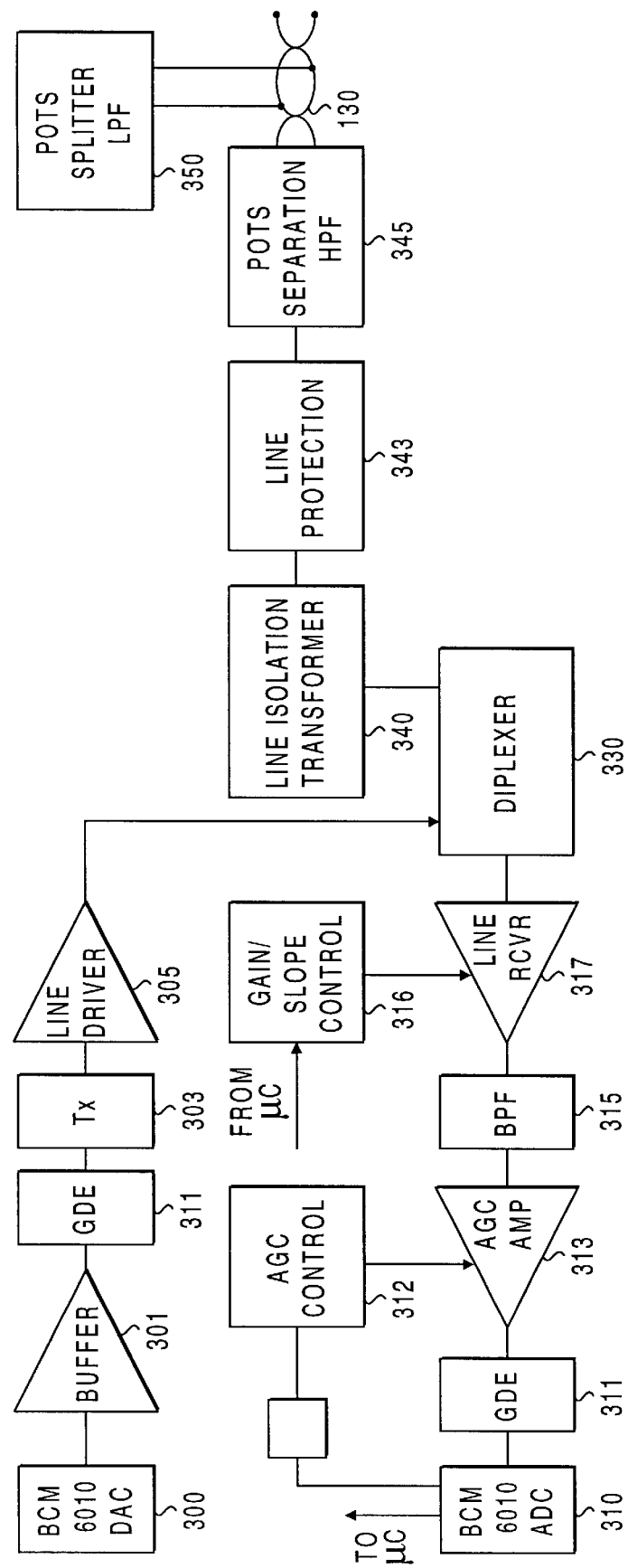
FIG. 3 illustrates a block diagram of the Analog Front End (AFE)

FIG. 3 illustrates a block diagram of an Analog Front End (AFE) of a VDSL network interface present in the RG 172. The RG 172 includes a VTU modem 115, known as a VTU-R modem. The AFE is part of the VTU-R modem 115 and interfaces the twisted wire pair 130. For downstream signal reception, the VDSL signal passes through a POTS separation High Pass Filter (HPF) 345 so as to filter out Direct Current (DC), ringing and voice band signals from the VDSL signal. The filtered signal then passes through a line protection 343 and a line isolation transformer 340 before being presented to a diplexer 330. The diplexer 330 performs upstream and downstream frequency separation. A line receiver 317 will pass or amplify the received signal with slope compensation, depending on the line condition. This operation is controlled by a gain/slope control 316 which will be described in further detail with respect to FIG. 4. In a preferred embodiment, the gain/slope control 316 receives commands from a micro-controller to control the amplification.

The output of the line receiver 317 is filtered by a Band Pass Filter (BPF) 315 to prevent out of band energy from affecting the dynamic range of an Automatin Gain Controller (AGC) Amp 313 and to prevent aliasing. In a preferred embodiment, the bandpass filtering is carried out by high-pass and then low-pass filtering the signal. The AGC Amp 313 boosts the signal to maximize the dynamic range at an Analog to Digital Converter (ADC) 310, such as a BCM 6010 manufactired by Broadcom. A Group Delay Equalizer (GDE) 311 corrects the phase distortion of the amplified signal before it reaches the ADC 310 for conversion into a digital signal.

In a preferred embodiment, a micro-controller (not illustrated), such as the MPC860, can be used along with the ADC 310 in setting the operating mode of the gain slope control 316 based on the received power. The use of the micro-controller with the ADC 310 will be described with respect to the power measurement method.

In the upstream direction a Digital to Analog Converter (DAC) 300, such as a BCM 6010 manufactured by Broadcom, converts the digital signal into an analog one. A buffer 301 converts the differential signal into a single ended signal. In a preferred embodiment, the output of the GDE 311 is passed to the transmit Low Pass Filter (LPF) 303 which is part of a diplexer with transition frequency at 1.2 MHz. The transmit LPF 303 is used as an anti-aliasing filter. A line driver 305 amplifies the upstream signal to approximately 0 dBm and converts it into a differential signal.

Figure 4:
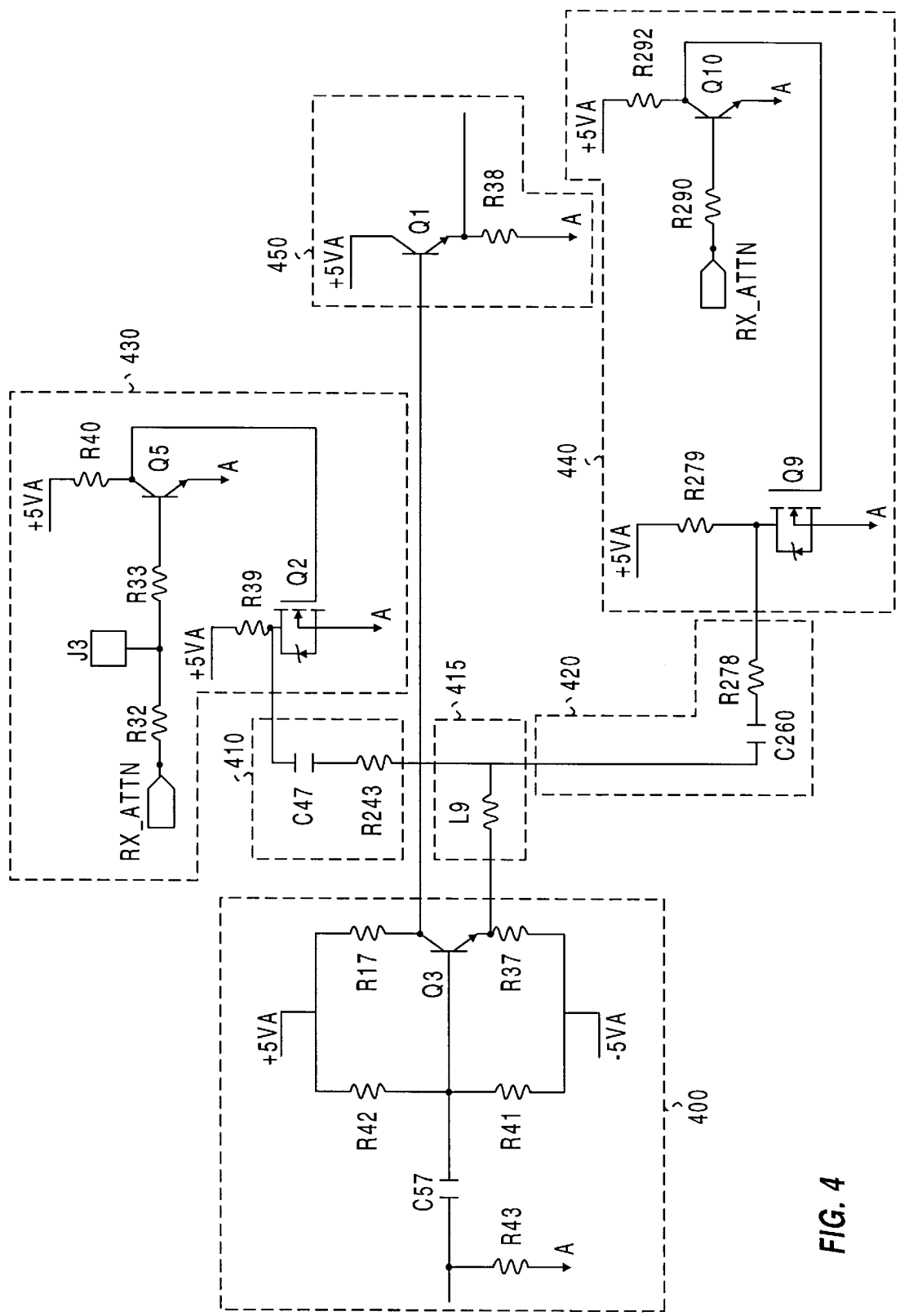
FIG. 4 illustrates a slope amplifier circuit of the AFE of FIG. 3.

FIG. 4 shows an AFE slope amplifier circuit. This circuit represents the gain/slope control 316 and the line receiver 317 of FIG. 3. An input stage 400 of the AFC slope amplifier circuit is composed of a Resistor and Capacitor (RC) circuit and a common emitter circuit with feedback. The input stage 400 acts as an input buffer to the AFE slope amplifier circuit. A transistor Q3 of the input stage 400 can be of the type MMBT3904LT1 or QN2222.

A first switching circuit 430 can activate a first RC network 410 depending on a binary signal RX_ATTN. A second switching circuit 440 is also controlled by the binary signal RX_ATTN. The second switching circuit 440, upon receiving a binary '1' at its input port, activates a second RC network 420. In a preferred embodiment, low Resistance Drain Source (RDS) Field Effect Transistors (FETs) are used as transistors Q2 and Q9 of the first switching circuit 430 and the second switching circuit 440, respectively. These transistors can be the FDV303N manufactured by Fairchild.

In a preferred embodiment, the feedback of the common emitter of the input stage 400 includes an inductor L9 of module 415, which can be coupled to at least one RC network.

When active, the first RC network 410 couples to inductor L9 of module 415 to form a resistor, inductor and capacitor (RLC) circuit with the inductor and capacitor (LC) part determining the resonant frequency and the resistor (R) reducing both the gain and the Q factor of the circuit, when increased.

When the second RC network 420 is activated along with the first RC network 410, the second RC network 420 adds capacitance to the RLC circuit formed by the first RC network 410 and the inductor L9 of module 415, thus additionally decreasing the resonant frequency.

An output stage 450 of the AFC slope amplifier circuit is an emitter follower with unity gain. Transistor Q1 of the output stage 450 can be of the same type as transistor Q5, transistor Q10 and transistor Q3.

Table 1 presents possible values for the components used in the AFE slope amplifier circuit for it to perform amplification. However, these values are in no way intended to limit the scope of the invention. As one skilled in the art would recognize, these components can have various values or configurations, or different components may be used without departing from the scope of the current invention.

TABLE 1 possible values of the components

| Component | value |
| --- | --- |
| R17 | 150 Ω |
| R37 | 249 Ω |
| R41 | 2.0 kΩ |
| R42 | 4.02 kΩ |
| R43 | 110 Ω |
| R243 | 10.0 Ω |
| R278 | 20.0 Ω |
| R33 | 10.0 kΩ |
| R39 | 10.0 kΩ |
| R40 | 10.0 kΩ |
| R279 | 10.0 kΩ |
| R290 | 10.0 kΩ |
| R292 | 10.0 kΩ |
| R38 | 110 Ω |
| C57 | 0.01 µF |
| C47 | 1500 pF |
| C260 | 2200 pF |
| L9 | 390 nH |

The activation of the first RC network 410 and the second RC network 420 is determined by the operating mode set for the AFE slope amplifier circuit, as depicted in FIG. 5. The AFE slope amplifier circuit compensates for the frequency roll off caused by long lengths of the twisted wire pair cables as shown in FIG. 6.

FIG. 5 illustrates the four different operating modes of the AFE slope amplifier circuit. The binary control signal in column 500 contains, in a preferred embodiment, 2 bits which can be set to '0' or '1' to control the ON/OFF states of the first switching circuit 430 and the second switching circuit 440 listed in columns 510 and 530, respectively. The present invention can be used to provide flat gain to the input signal. In this embodiment, only circuit 410 is activated.

In a preferred embodiment of this invention, the operating mode can be determined based on a power level of the signal across the band. A power measurement is performed on the received signal and depending on the measured power level, a predetermined operating mode is selected.

In an alternative embodiment, the operating mode is determined based on the loop length. Column 550 of FIG. 5 lists the loop length corresponding to each of the four operating modes.

In an alternate embodiment, remote provisioning from a management system can be applied to set the operating mode of the AFE slope amplifier circuit.

In a preferred embodiment, the power measurement is performed using a micro-controller, such as the MPC860, running a C code or any other code supported by the micro-controller, along with the ADC 310. In this embodiment, the digital samples obtained from the ADC 310 are processed to determine the peak power of the received signal. In a preferred embodiment, the system assumes known cable and transmitter characteristics and calculates a power value which is then compared to the peak power of the received signal. This value is used to control the AGC amplifier 313 as illustrated in FIG. 3 by the connection between the ADC 310 and the AGC control 312. The micro-controller can access the registers inside the ADC 310 to read this value and send a control command to the gain/slope control 316 for setting the appropriate operating mode.

Figure 6A:
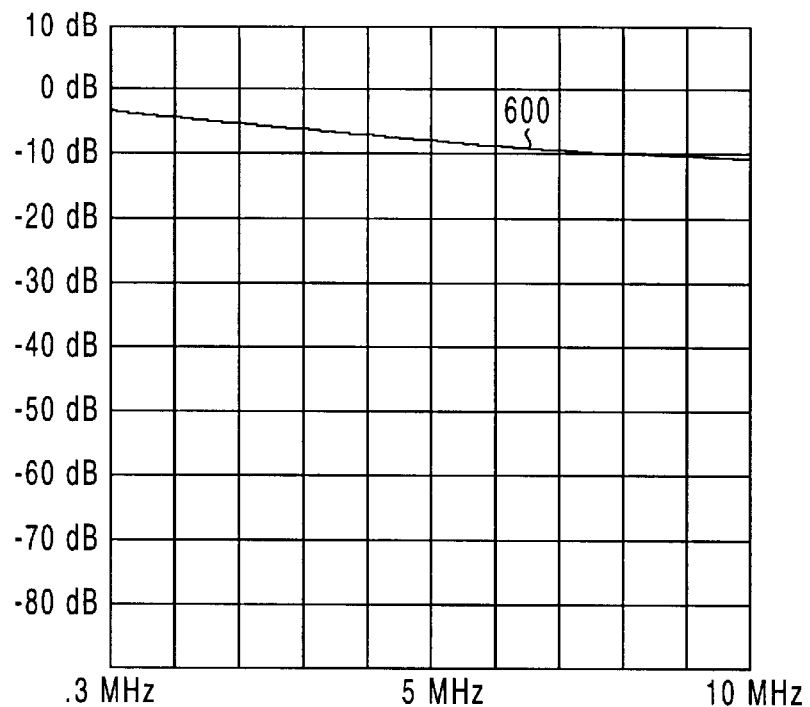
FIGS. 6A, 6B, 6C and 6D illustrate the frequency roll-off for different loop lengths.
Figure 6B:
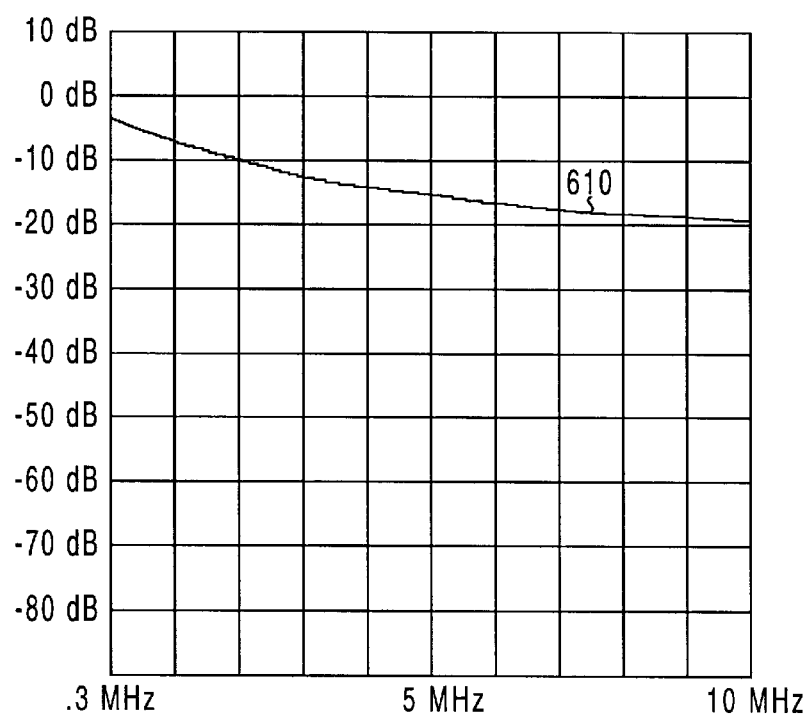
Figure 6C:
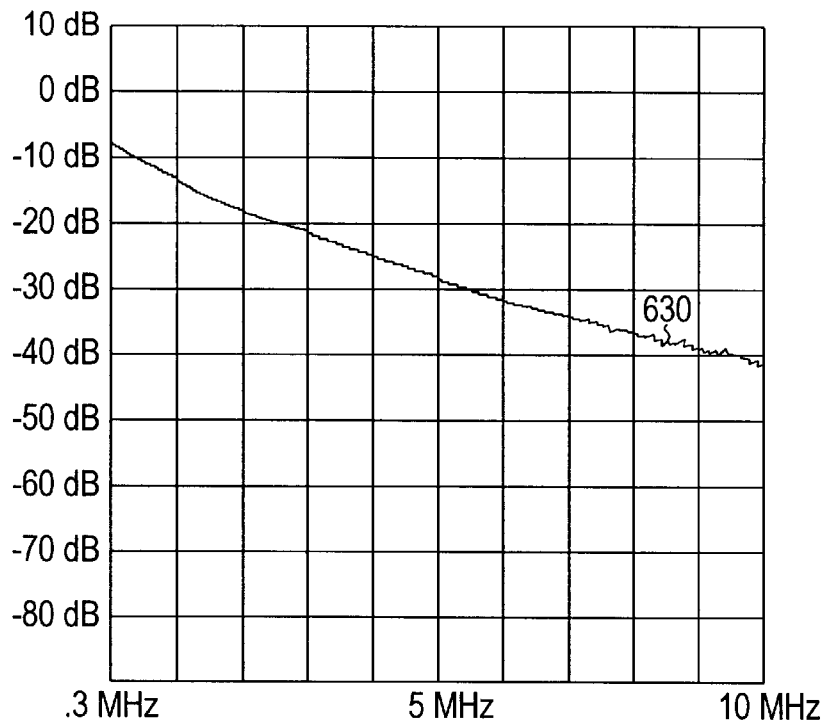
Figure 6D:
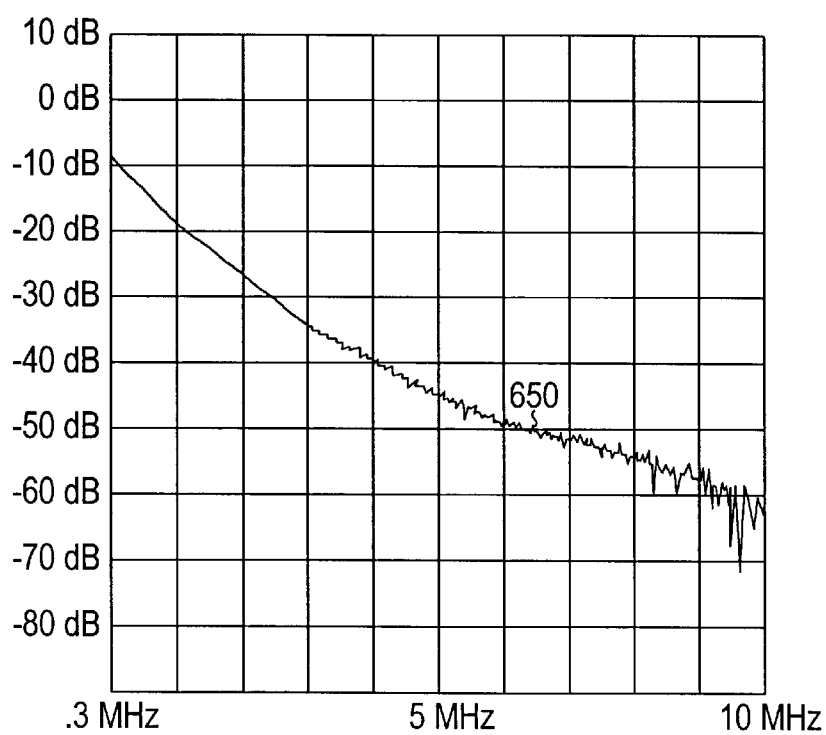

FIGS. 6A, 6B, 6C and 6D show the frequency roll-off for different loop lengths. Curve 600 in FIG. 6A shows the attenuation of a 500-ft long loop. The total attenuation across the whole band is less than 10 dB. The attenuation curve for a 1 kft long loop is depicted in curve 610 of FIG. 6B. The attenuation across the transmission band is less than 20 dB. The attenuation curves for the loop lengths of 2 kft and 3 kft are represented by curve 630 in FIG. 6C and curve 650 in FIG. 6D, respectively. The attenuation for 2 kft long loop is less than 35 dB while the attenuation for 3 kft long loop is more than 50 dB.

Figure 7:
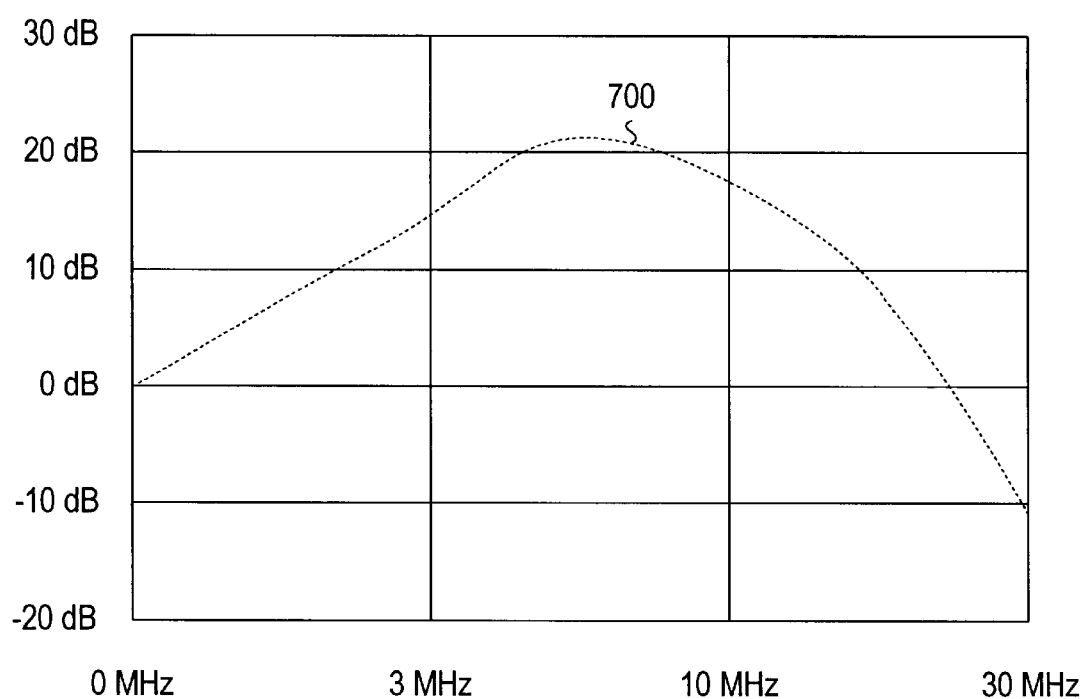
FIG. 7 illustrates the transfer function of the AFE slope amplifier circuit.

FIG. 7 illustrates an example slope amplifier transfer function. The example slope amplifier transfer function presents a positive slope on frequencies below the resonant frequency, which in a preferred embodiment is around 8 MHz, while the frequencies above the resonant frequency are amplified with a negative slope. Furthermore, the example slope amplifier transfer function provides no amplification at approximately 0 and 25 MHz, a positive amplification between 0 and 25 MHz, and a negative amplification below 25 MHz. In an alternative embodiment, other resonant frequencies can be obtained by adjusting the component values of the RLC circuit of FIG. 4.

Figure 8:
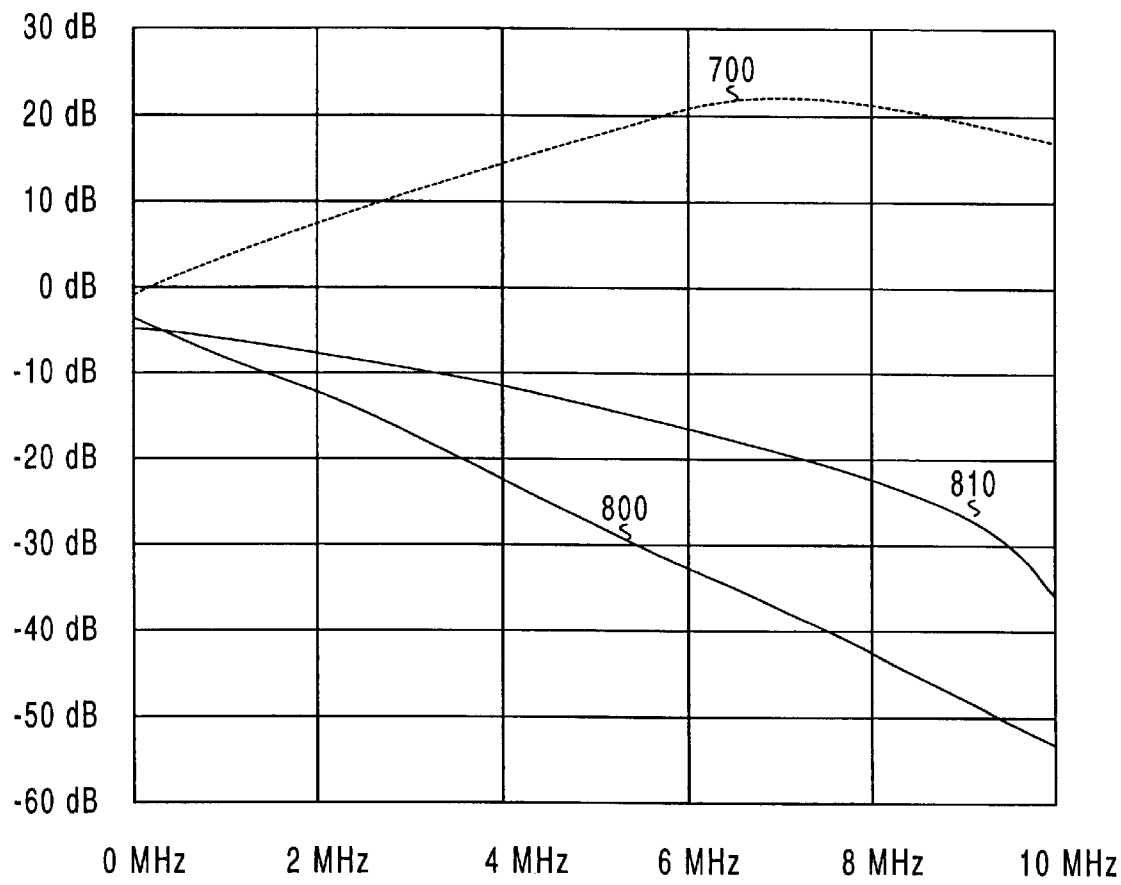
FIG. 8 illustrates the result of slope amplification applied to a received VDSL signal.

FIG. 8 shows the result of the slope amplification applied on a received VDSL signal. Curve 800 is a received VDSL signal without slope amplification. The frequency roll-off results in severe attenuation at high frequency. Curve 810 is a slope amplified VDSL signal. The high end of the VDSL spectrum is more amplified than the low end of the spectrum. Also redrawn in FIG. 8, is the slope amplifier transfer function represented by curve 700.

Although this invention has been illustrated by reference to specific embodiments, it will be apparent to those skilled in the art that various changes and modifications may be made, which clearly fall within the scope of the invention. The invention is intended to be protected broadly within the spirit and scope of the appended claims.

What is claimed is:

1. In a telephone signal transmission system, a method of reliably receiving a signal, said method comprising:
   receiving the signal from a twisted wire pair drop cable;
   determining when the received signal is substantially attenuated; and
   selectively amplifying a portion of the received signal to compensate for frequency dependent attenuation, wherein said selectively amplifying includes using a resonator circuit which can be selectively switched in and out of an amplification module, wherein said selectively amplifying further includes at least one control circuit and each of said at least one resonator circuits is connected to a respective said at least one control circuit.

2. The method of claim 1, wherein the received signal is above 1.5 MHz.

3. The method of claim 1, wherein the attenuated portion of the received signal is in the range of approximately 1.8 MHz to 25 MHz.

4. The method of claim 1, wherein the resonator circuit includes an inductor and a capacitor and is switched in and out of the amplification module using a field effect transistor.

5. The method of claim 1, wherein said selectively amplifying is based on a length of the twisted wire pair drop cable.

6. The method of claim 1, wherein said selectively amplifying is based on a power measurement of the received signal.

7. In a telephone signal transmission system where a signal is transmitted from a first location to a second location over a twisted wire pair transmission path, an apparatus for reliably receiving said signal, said apparatus comprising an amplification circuit for applying selective gain to a received digital subscriber line signal to compensate for losses in said twisted wire pair transmission path, wherein said amplification circuit includes at least one resonator circuit and said at least one resonator circuit can be selectively switched in and out of said amplification circuit, further wherein said amplification circuit further includes at least one control circuit and each of said at least one resonator circuits is connected to a respective said at least one control circuit.

8. The apparatus of claim 7, wherein the selective gain is applied in the range of 1.8 MHz to 25 MHz.

9. In a digital subscriber line transmission system where a signal is transmitted from a first location to a second location over a twisted wire pair transmission path, an apparatus for reliably receiving said signal, said apparatus comprising an amplification circuit for applying selective gain to a received digital subscriber line signal to compensate for losses in said twisted wire pair transmission path, wherein said amplification circuit includes at least one resonator circuit and said at least one resonator circuit can be selectively switched in and out of said amplification circuit, wherein said amplification circuit further includes at least one control circuit and each of said at least one resonator circuits is connected to a respective said at least one control circuit.

10. The apparatus of claim 9, wherein each of said at least one control circuits receives a digital control signal.

11. The apparatus of claim 10, wherein said digital control signal is a binary signal having at least one bit to activate at least one of said resonator circuits.

12. The apparatus of claim 11, wherein said binary signal has two bits which can be set to achieve one of four individual levels of selective amplification.

13. The apparatus of claim 10, wherein the digital control signal is based on a length of said twisted wire pair transmission path.

14. The apparatus of claim 10, wherein the digital control signal is based on a power measurement of the received digital subscriber line signal.

15. In a telephone signal transmission system, a method of reliably receiving a signal, said method comprising:

receiving the signal from a twisted wire pair drop cable;

determining a gain factor to be applied to the signal; and switching at least one resonator circuit into a gain path traversed by the signal to compensate for losses, wherein said switching includes using at least one control circuit and each of said at least one resonator circuit is connected to a respective said at least one control circuit.

16. The method of claim 15, wherein said determining a gain factor includes determining the gain factor to be applied to the signal in the range of approximately 1.8 to 25 MHz.

17. The method of claim 15, wherein said determining a gain factor includes determining the gain factor based on a power measurement performed on the received signal.

18. The method of claim 17, wherein the power measurement is accomplished by processing digital samples of the received signal to determine a measured peak power which is compared to a calculated peak power.

19. The method of claim 15, wherein said determining a gain factor includes determining the gain factor based on a length of the digital subscriber line.

\* \* \* \* \*